Patented Aug. 14, 1934

1,969,732

UNITED STATES PATENT OFFICE 1,969,732

PRODUCTION OF ORTHO-DIHYDROXY BENZENES

Frederick Baxter Downing, Carneys Point, N. J., and Richard Gesse Clarkson, Wilmington, Del., assignors to E. I. du Pont de Nemours & Company, Wilmington, Del., a corporation of Delaware No Drawing. Application November 4, 1932,
Serial No. 641,318

13 Claims. (Cl. 260—154)

This invention relates to poly-hydroxy aromatic compounds, more particularly o-dihydroxy compounds of the benzene series, and a process for the manufacture thereof.

In a co-pending application of F. B. Downing, R. G. Clarkson and H. H. Reynolds, Serial No. 632,630, a process is described for the production of o-dihydroxy compounds of the benzene series by the direct hydrolysis of o-dihalogen compounds of the benzene series with water and alkaline hydrolyzing agents in the presence of barium or strontium ions. The method described has been particularly valuable in the production of o-dihydroxy benzene from o-dichloro benzene. It has been found, however, that when the hydrolysis of o-dichloro benzene is carried out in this manner, for example, with sodium hydroxide and barium chloride in the presence of cuprous oxide, the reaction liquor is dark brown in color, and this brown color is also retained by the solid barium salt of o-dihydroxy benzene which is recovered, so that further purification is generally desirable.

It is an object of the present invention to provide a new and improved method for producing o-dihydroxy compounds of the benzene series. A further and more specific object is the provision of a new and improved process for the production of o-dihydroxy benzene. Another object is the provision of a method of increasing the yields which may be obtained in the production of o-dihydroxy benzenes by the hydrolysis of o-dihalogen benzenes with water and an alkaline hydrolyzing agent in the presence of barium or strontium ions. A still further object is the provision of a method of obtaining o-dihydroxy benzenes directly in a relatively pure state. Other objects will appear hereinafter.

These objects are accomplished according to the present invention whereby in the production of o-dihydroxy compounds of the benzene series by the hydrolysis of an o-dihalogen compound of the benzene series, for example, such as described in the co-pending application previously referred to, the process is characterized by the improvement that oxygen is removed from the zone of reaction, preferably by the addition of a reducing agent adapted to combine with molecular oxygen under the conditions of reaction.

While the invention is susceptible to considerable variation and modification in the manner of its practical application, particularly as regards the proportions of materials, temperatures, pressures and exact method of procedure, the following examples, in which the parts are by weight, will illustrate how it may be practiced.

Example I

Fifteen parts of o-dichloro benzene (about 93.5% purity), 24 parts of barium chloride ($BaCl_2.2H_2O$), 52 parts of 31% sodium hydroxide solution, 97.5 parts of water, 0.06 parts of cuprous oxide and about 0.25 parts of sodium formate were charged into a steel autoclave being of such size that it was approximately ¾ full. The autoclave was heated at a temperature of about 275° C. for ten hours, the pressure developed being about 850 to 950 pounds per square inch. It was then cooled, opened and the contents washed out with water into a suitable receiver. It was noted that the suspended barium salt of o-dihydroxy benzene was a very light yellow in color. The mixture of water solution and suspended barium salt of o-dihydroxy benzene was made acid with a 20% solution of hydrochloric acid and the liquid heated gently for a few minutes. The solution was then filtered to remove any undissolved solids and then extracted with ether. The extract was evaporated to a small volume and dried in vacuo for a period of about 12 to 16 hours at about 60° C. The residue was o-dihydroxy benzene of about 98% purity. Another run was carried out according to the same procedure.

Two more runs were then made with the same charges as before and under the same conditions, except that no sodium formate was added to the reaction mixture. The average yield for these two runs was about 5.3% less than average yield where sodium formate was included in the reaction mixture. In each case, the solid barium salt of the o-dihydroxy benzene was brown in color.

Example II

An autoclave similar to that described in Example I was charged with about 31.5 parts of barium hydroxide-octahydrate, 7.3 parts of o-dichloro benzene, .05 parts of cuprous oxide, 68 parts of water (corresponding to an alkali concentration of barium hydroxide of about 2.44 normal), and about 0.12 parts of sodium formate were added. The autoclave was heated to a temperature of about 275° C. for a period of about ten hours under autogenous pressure. The product was recovered as described in Example I in a substantially pure state.

The process of the present invention is generally applicable in processes involving the production of o-dihydroxy compounds of the benzene series by the hydrolysis of o-dihalogen compounds of the benzene series, and particularly where alkaline hydrolyzing agents are used. The proportions, concentrations, and character of the reactants, the temperatures, pressures, catalysts and method of procedure may be the same as described in the co-pending application referred to, with the added feature introduced by the present invention that oxygen is removed from the zone of hydrolysis.

The reducing agents used in accordance with the present invention may be such substances as are well known in the art as reducing agents in alkaline solutions. Particularly desirable results have been obtained in the use of a reducing agent such as sodium formate. As further specific examples of reducing agents which may be employed may be mentioned sodium hydrosulfite, sodium formaldehyde sulfoxylate, and the like.

The quantity of the reducing agent used should preferably be sufficient to react with the oxygen of the air present in the reaction vessel or autoclave after the introduction of the reactants. The quantity of sodium formate required to react with the oxygen of the air according to the equation:

$$O_2 + 2NaOCHO + 2NaOH \rightarrow 2Na_2CO_3 + 2H_2O$$

is about one ounce per cubic foot of air at standard conditions. In general, it is preferable to employ about one to about two ounces of sodium formate per cubic foot of air space in the autoclave after the reactants have been introduced. Larger amounts of sodium formate tend to decrease the yield, probably by forming carbonate which removes barium (or strontium) from the reaction mixture. This may be corrected by adding more barium (or strontium) chloride and more sodium hydroxide to the reaction mixture, but no particular advantage is obtained thereby. Smaller amounts of sodium formate produce benefits in proportion to the amount employed.

In the production of o-dihydroxy benzene desirable results are obtained by reacting together o-dichloro benzene, water, hydroxyl ions, and barium or strontium ions in the presence of a catalyst and a reducing agent in proportions corresponding to about one mole of o-dichloro benzene, about two to about four equivalents of a water-soluble barium or strontium compound, about two to about four equivalents of hydroxyl, an amount of water corresponding to an alkali concentration within the range of about 1.0 to 3.6 normal, a small amount of catalyst, and a small amount of the reducing agent. The catalyst may be a substance which is effective in catalyzing the Ullmann reaction. The temperature of the reaction may vary widely but should preferably be above about 250° C. and below the decomposition temperature, that is, the temperature giving rise to the formation of substantial amounts of decomposition products. According to our preferred procedure, o-dihydroxy benzene is produced by heating together under autogenous pressure, at a temperature of about 275° C. to about 285° C., a mixture of o-dichloro benzene, barium chloride, cuprous oxide, sodium hydroxide, sodium formate and water, in proportions corresponding to about one mole of o-dichloro benzene, about one mole of barium chloride, about four moles of sodium hydroxide, about 0.05% to about 2.0% of cuprous oxide (based on the weight of o-dichloro benzene), sufficient water to render the alkali concentration about 2.9 normal and about 1 to about 2 ounces of sodium formate per cubic foot of air space in the autoclave after the reactants are introduced.

While the invention is not limited to any theory as regards the mechanism of the reaction, it appears that the removal of the oxygen in the air in the autoclave prevents it from destroying the product. That the function of a reducing agent, such as sodium formate, is primarily to remove this oxygen and does not affect the reaction otherwise was shown by an experiment in which two autoclaves, each containing 5.5 parts of o-dihydroxy benzene, 15.7 parts of barium hydroxide, 12.2 parts of barium chloride, and 54 parts of water were sealed up and heated at 275° C. for ten hours. One autoclave contained also one part of sodium formate. The recovery of o-dihydroxy benzene from this autoclave was about 5% more than from the other. The difference is almost identical with the increase in yield caused by the addition of sodium formate, as in Example I. It appears, therefore, that the sodium formate has little, if any, effect upon the course of the initial reaction.

Instead of using a reducing agent, other methods of removing oxygen from the autoclave, such as displacing the air with nitrogen or other inert gas, or evacuating the vapor space, may be employed.

The invention is particularly advantageous in that it affords an improved method of producing o-dihydroxy benzenes from o-dihalogen benzenes whereby increased yields are obtained over previously proposed processes. Another advantage of the invention lies in the fact that the o-dihydroxy benzene may be produced in a better state of purity than heretofore, eliminating some of the difficulties of subsequent purification. Another novel feature of the invention lies in the elimination of oxygen from the reaction vessel or autoclave by means of sodium formate, an unexpected result in that sodium formate might decompose without destroying the oxygen to give, for example, carbon monoxide.

As many apparently widely different embodiments of this invention may be made without departing from the spirit and scope thereof, it is to be understood that we do not limit ourselves to the specific embodiments thereof except as defined in the following claims.

We claim:

1. In a process of producing o-dihydroxy compounds of the benzene series by the hydrolysis of an o-dihalogen compound of the benzene series, the step which comprises removing molecular oxygen from the reaction zone.

2. In a process of producing o-dihydroxy compounds of the benzene series by the hydrolysis of an o-dihalogen compound of the benzene series, the step which comprises adding a reducing agent adapted to combine with molecular oxygen under the conditions of the reaction to the reaction zone.

3. In the process of producing o-dihydroxy compounds of the benzene series by the hydrolysis of an o-dihalogen compound of the benzene series, the step which comprises adding sodium formate to the reaction zone.

4. In a process of producing o-dihydroxy benzene by the hydrolysis of o-dichloro benzene in the presence of water, hydroxyl ions and metal ions selected from the group consisting of barium and strontium, the step which comprises adding a reducing agent adapted to combine with molecular oxygen under the conditions of the reaction to the reaction mixture.

5. In a process of producing o-dihydroxy benzene by the hydrolysis of o-dichloro benzene in the presence of water, hydroxyl ions and metal ions selected from the group consisting of barium and strontium, the step which comprises adding sodium formate to the reaction mixture.

6. The process of producing o-dihydroxy benzene which comprises reacting together o-dichloro benzene, water, hydroxyl ions, a water-soluble compound selected from the group consisting of barium and strontium compounds, a catalyst for the Ullmann reaction, and a reducing agent adapted to combine with molecular oxygen under the conditions of the reaction, under super-atmospheric pressure in proportions corresponding to about one mole of o-dichloro benzene, about two to about four equivalents of water-soluble barium or strontium compounds, about two to about four equivalents of hydroxyl, a small amount of catalyst, an amount of reducing agent sufficient to combine with the free oxygen in the reaction vessel, an amount of water corresponding to an alkali concentration within the range of about 1.0 to about 3.6 normal while maintaining the reaction temperature above about 250° C. and below the decomposition temperature.

7. The process of producing o-dihydroxy benzene which comprises heating together under autogenous pressure at a temperature of about 275° C. to about 285° C. a mixture of o-dichloro benzene, barium chloride, cuprous oxide, sodium hydroxide, water and sodium formate in proportions corresponding to about one mole of o-dichloro benzene, one mole of barium chloride, four moles of sodium hydroxide, a small amount of cuprous oxide, sufficient water to render the alkali concentration about 2.9 normal and about one to two ounces of sodium formate per cubic foot of air space in the reaction vessel after the reactants are introduced.

8. In a process of producing o-dihydroxy compounds of the benzene series by the hydrolysis of o-dihalogen compounds of the benzene series, the step which comprises adding to the reaction zone a reducing agent adapted to combine with molecular oxygen under the conditions of the reaction, the amount of said reducing agent being not substantially greater than that required to combine with the free oxygen in the reaction zone.

9. In a process of producing o-dihydroxy compounds of the benzene series by the hydrolysis of an o-dihalogen compound of the benzene series, the step which comprises adding to the reaction zone sodium formate, in amount not substantially greater than that required to combine with the free oxygen present in the reaction zone.

10. In a process of producing an o-dihydroxy benzene by the hydrolysis of an o-dichlorobenzene in the presence of water, hydroxyl ions and metal ions selected from the group consisting of barium and strontium, the step which comprises adding to the reaction mixture a reducing agent adapted to combine with molecular oxygen under the conditions of the reaction, the amount of said reducing agent being not substantially greater than that required to combine with the free oxygen in the reaction vessel.

11. In a process of producing o-dihydroxy benzene by the hydrolysis of o-dichlorobenzene in the presence of water, hydroxyl ions and metal ions selected from the group consisting of barium and strontium, the step which comprises adding to the reaction mixture a reducing agent adapted to combine with molecular oxygen under the conditions of the reaction, the amount of said reducing agent being not substantially greater than that required to combine with the free oxygen in the reaction vessel.

12. In a process of producing o-dihydroxy benzene by the hydrolysis of o-dichlorobenzene in the presence of water, hydroxyl ions and metal ions selected from the group consisting of barium and strontium, the step which comprises adding to the reaction mixture sodium formate in amount not substantially greater than required to combine with the free oxygen in the reaction vessel.

13. The process of producing o-dihydroxy benzene which comprises reacting together o-dichlorobenzene, water, hydroxyl ions, a water-soluble compound selected from the group consisting of barium and strontium compounds, a catalyst for the Ullmann reaction, and a reducing agent adapted to combine with molecular oxygen under the conditions of reaction, under super-atmospheric pressure, in proportions corresponding to about one mole of o-dichlorobenzene, about two to about four equivalents of water-soluble barium or strontium compounds, about two to about four equivalents of hydroxyl, a small amount of catalyst, an amount of reducing agent not substantially greater than required to combine with the free oxygen in the reaction vessel, and an amount of water corresponding to an alkali concentration within the range of about 1.0 to about 3.6 normal, while maintaining the reaction temperature at about 275° C. to about 285° C.

FREDERICK B. DOWNING.
RICHARD G. CLARKSON.